Dec. 1, 1936. W. L. MORRISON 2,062,328
BUMPER DEVICE FOR AUTOMOBILES
Filed Sept. 26, 1933 3 Sheets-Sheet 1

Inventor;
Willard L. Morrison,
By Parker & Carter
Attys.

Dec. 1, 1936.　　　W. L. MORRISON　　　2,062,328
BUMPER DEVICE FOR AUTOMOBILES
Filed Sept. 26, 1933　　　3 Sheets-Sheet 2
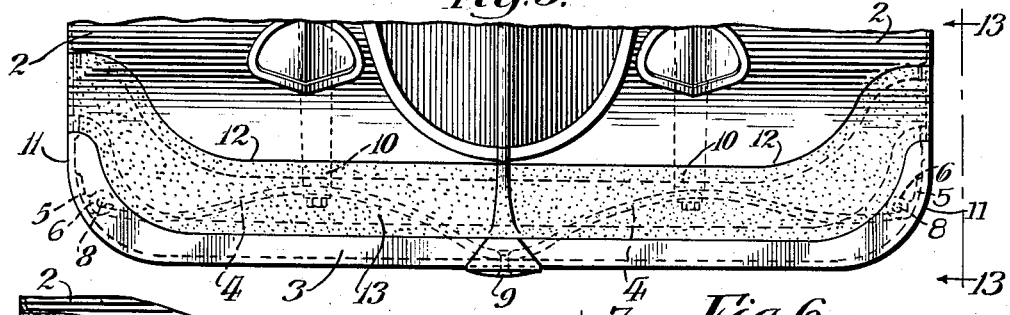
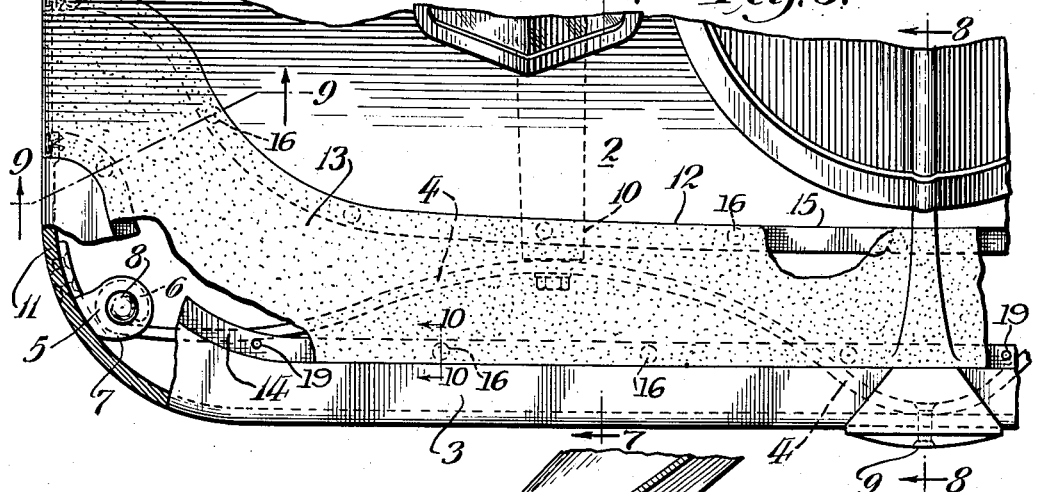
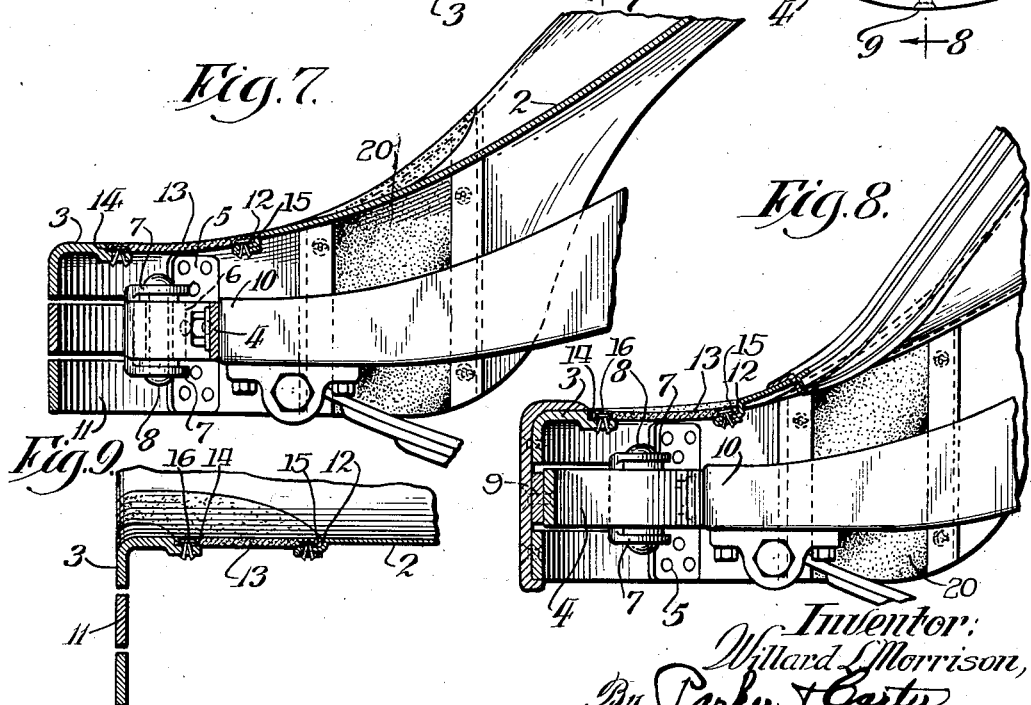
Inventor:
Willard L. Morrison,
By Parker & Carter
Attys.

Dec. 1, 1936.   W. L. MORRISON   2,062,328
BUMPER DEVICE FOR AUTOMOBILES
Filed Sept. 26, 1933    3 Sheets-Sheet 3
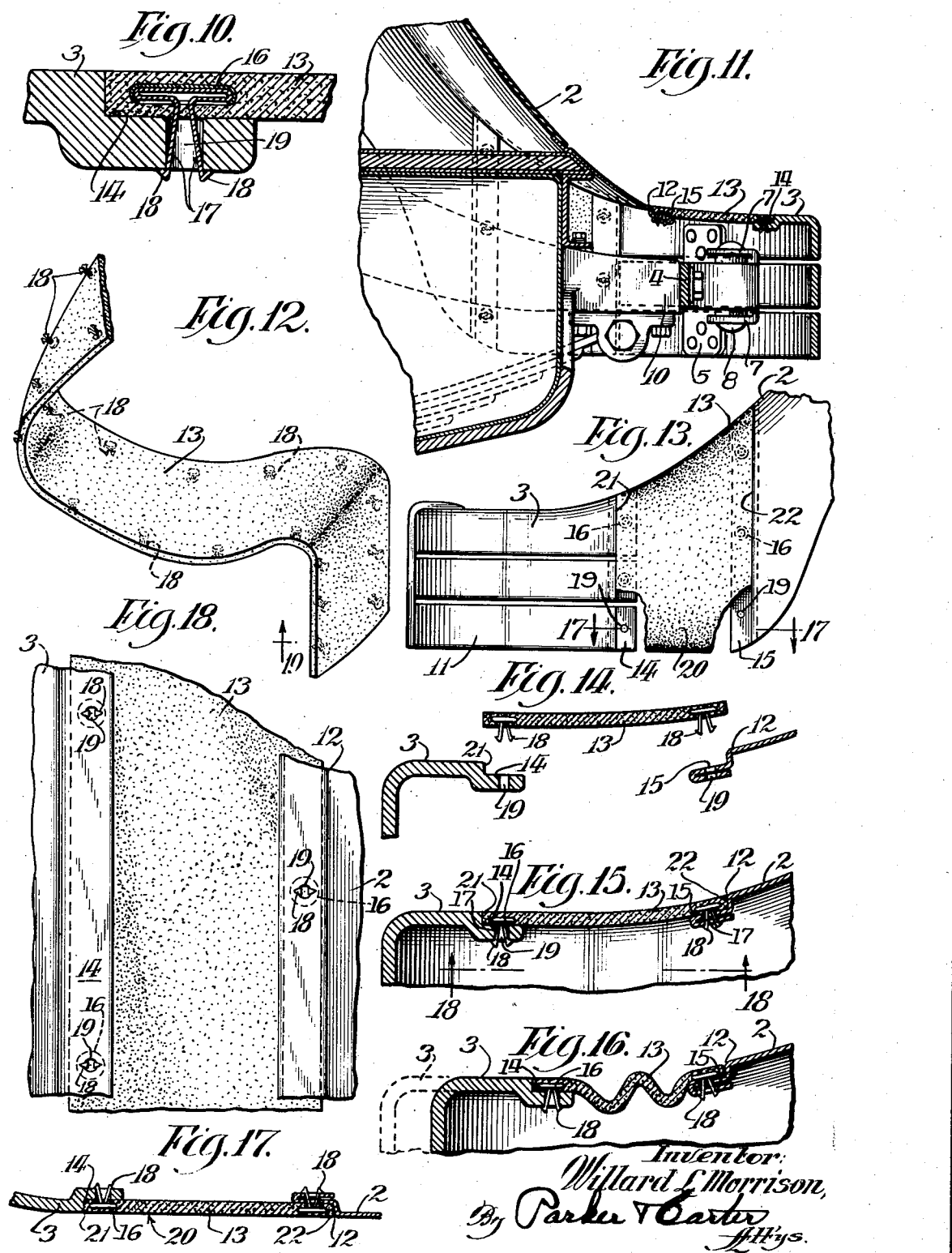

Patented Dec. 1, 1936

2,062,328

UNITED STATES PATENT OFFICE 2,062,328

BUMPER DEVICE FOR AUTOMOBILES

Willard L. Morrison, Lake Forest, Ill.

Application September 26, 1933, Serial No. 691,011

7 Claims. (Cl. 293—55)

This invention relates to automobile bumper constructions and has for its object to provide a new and improved device of this description. The invention has as a further object to provide a bumper construction wherein there is no open space between the bumper and the body of the automobile. The invention has as a further object to provide a bumper construction wherein there is a flexible connection between the bumper and the body of the automobile which closes the space between them. The invention has further objects which are more particularly pointed out in the accompanying description.

Referring now to the drawings, Fig. 1 is a view of an automobile showing one form of bumper device embodying the invention;

Fig. 5 is a plan view of the front end portion of the automobile showing the bumper device in position;

Fig. 6 is an enlarged view of a portion of Fig. 5;

Fig. 7 is a sectional view taken on line 7—7 of Fig. 6;

Fig. 8 is a sectional view taken on line 8—8 of Fig. 6;

Fig. 9 is a sectional view taken on line 9—9 of Fig. 6;

Fig. 10 is a sectional view taken on line 10—10 of Fig. 6;

Fig. 11 is an enlarged sectional view showing the rear bumper construction;

Fig. 12 is a perspective view of the stream line resilient strip used between the bumper and the body;

Fig. 13 is an enlarged side view of a portion of the front end of Fig. 1;

Fig. 14 is a view of a portion of Fig. 7 with the stream line resilient strip just before being attached in position;

Fig. 15 is a view similar to Fig. 14 showing the stream line resilient strip in position;

Fig. 16 is a view similar to Fig. 15 showing the parts after the bumper has been struck;

Fig. 17 is a sectional view taken on line 17—17 of Fig. 13;

Fig. 18 is a view taken on line 18—18 of Fig. 15.

Like numerals refer to like parts throughout the several figures.

In this construction I have shown an automobile having a main body portion 1 with laterally extending side pieces 2 which project forwardly and rearwardly up to and preferably a little beyond the front and rear ends of the main body portion 1. At the front and rear there is provided a bumper member and as the two bumper members are similar, I will describe only one in detail.

Figure 3:
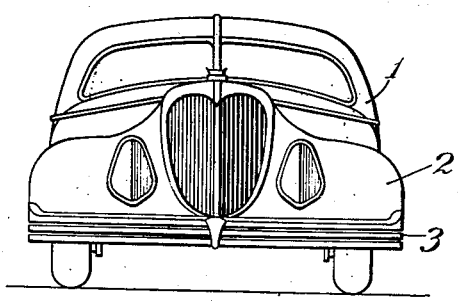
Fig. 3 is a front end view of Fig. 1.
Figure 4:
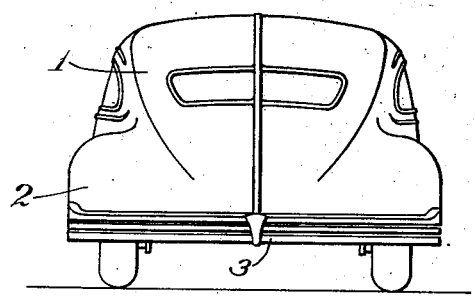
Fig. 4 is a rear end view of Fig. 1.

In this construction the bumper member 3 is preferably made in sections, as shown in Figs. 3 and 7, although it may be made in any other desired form. Connected with the bumper member is a spring member 4, this member being connected in any desired manner to the bumper member near the ends and near the middle. This connection may be made in any suitable manner.

As herein shown there is a bracket 5 connected to the bumper member near each end, see Fig. 7, and the spring member 4 is provided with a loop 6 which fits in between the portions 7 of the bracket and is held in place by the pin or rivet 8. At the center the spring member 4 may be riveted to the bracket member by the pivot 9. The spring resisting member is connected with a rigid part of the chassis in any desired manner.

As herein shown it is connected to the parts 10 which resist its inward movement. The bumper member is bent at its ends so as to form the bent portions 11, see Figs. 5 and 6. Connected with the bumper member and covering the intermediate space between the bumper member and the edge 12 is a flexible member 13, preferably resilient, and which when in position conforms to the stream lines of the automobile body. This flexible member may be connected in place in any desired manner.

I have shown a preferred construction wherein the bumper member is provided with a recess 14 and the edge of the body is provided with a recess 15. The resilient member fits in these recesses so as to be preferably flush with the bumper member face and the face of the body. This bumper member is resilient and may be made of any suitable resilient material, preferably rubber. It may be connected with the bumper member and the body in any desired manner.

As herein shown there is embedded in this member 13 at suitable intervals fastening devices, each consisting of loops 16 forming an enlarged end, see Fig. 10, which are preferably of spring metal, and have the spring prongs 17 with the hooks 18 on the ends thereof. The bumper element and the body portion are provided at intervals with the holes 19. In placing the resilient strip in position these fastening devices are brought opposite the proper holes, as shown in Fig. 14, and the resilient strip placed downwardly. The prongs pass through the holes and then spring outwardly so that the hooks 18 engage the metal surrounding the holes, see Figs. 10 and 15, and hold the resilient element in position. When it is desired to remove the resilient element the prongs are moved towards each other so as to release the hooks 18 and the resilient element may then be pulled upwardly and disconnected from the bumper element and the body. The resilient member has the bent end sections 20, see Fig. 13, which are bent downwardly and which are attached to the forward portion of the bent ends 11 of the bumper element.

It will be seen that there is here provided a member between the bumper member and the body which covers the space between the bumper member and the body and which conforms to the stream line of the body, forming a complete closure between the bumper element and the body and also conforming to the lines of the body so that a stream line structure is provided from the end of the front bumper along the body to the end of the rear bumper.

The rear bumper construction is shown in Fig. 11 and is similar in every particular to the front bumper element and I have applied the same reference letters thereto.

Figure 1:
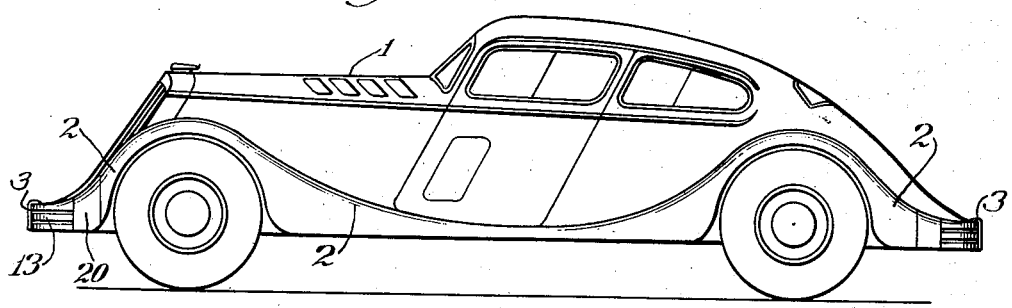
Figure 2:
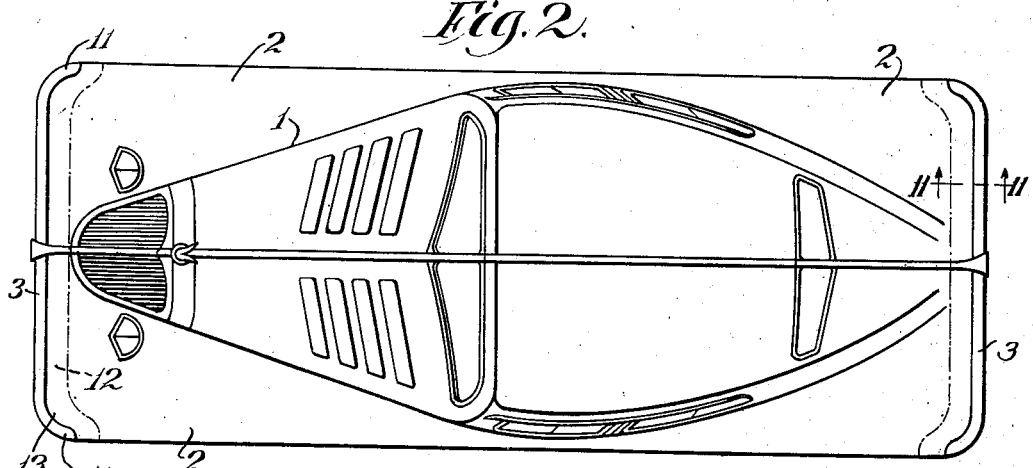
Fig. 2 is a plan view of the automobile shown in Fig. 1.

The bumper elements when in their normal position are shown in Figs. 2, 5, and 7. When a bumper element is struck it is pushed inwardly and the resilient member 13 gives and bends, as shown for example in Fig. 16, the bumper element itself moving forward, as shown in full lines in this figure. It will be noted that when the bumper element is struck so as to apply pressure to the resilient element this pressure does not come on the fastening devices 16, but the edge of the resilient member and the shoulder 21 on the bumper element and the shoulder 22 on the body. After the impact the spring member 4 moves the bumper back to its normal position and the resilient member 13 is straightened out again, as shown in Figs. 7 and 15.

I claim:

1. A bumper device for automobiles comprising a bumper element, a support for said bumper element, means for movably fastening it to said support at the end of the body portion of the automobile, a resisting device opposing the movement of the bumper element, and a flexible member connected with the bumper element and the body portion of the automobile, said flexible member extending substantially in a generally horizontal direction between the end of the body portion and the bumper element, filling the space between them, the upper face of the end portion of the body portion and of the flexible member and the bumper element forming a continuous structure.

2. A bumper device for automobiles comprising a bumper element, means for movably fastening it in position at the end of the body portion of the automobile, a resisting device opposing the movement of the bumper element and a flexible member connected with the bumper element and the body portion of the automobile and covering the space between them, said flexible member being made of resilient material.

3. A bumper device for automobiles comprising a bumper element, a support for said bumper element, means for movably fastening it to said support at the end of the body portion of the automobile, and a flexible member consisting of a sheet of material connected with the bumper element and the body portion of the automobile said flexible member extending substantially in a generally horizontal direction between the end of the body portion and the bumper element, filling the space between them, the upper face of the end portion of the body portion and of the flexible member and the bumper element forming a continuous structure, said flexible member having its upper face flush with the upper faces of the bumper element and the body portion at the points where it is connected therewith.

4. A bumper device for automobiles comprising a bumper element, means for movably fastening it in position at the end of the body portion of the automobile, and a flexible member consisting of a sheet of material connected with the bumper element and the body portion of the automobile and covering the space between them, the bumper element and the body portion having shoulders which engage the edges of the flexible member when the bumper element is struck.

5. A bumper device for automobiles comprising a bumper element, a spring connected with the bumper and a fixed part on the automobile, a flexible member extending in a generally horizontal direction across the end of the automobile, between the bumper element and the body portion of the automobile and forming a continuous horizontally extending covering portion between the end of the automobile and the bumper element, said flexible element connected with said bumper and said body so that when the bumper is struck the flexible element will bend and permit the bumper element to move toward the body, the spring member, when the bumper element is released, moving it back to its initial position and straightening out the flexible member.

6. A bumper device for automobiles comprising a bumper element, a flexible member extending between the bumper element and the body of the automobile, fastening devices for fastening said flexible element to said bumper and to the automobile body, comprising an enlarged portion with spring portions adapted to pass through holes in the bumper element and the body portion, and having hooks which engage the bumper element and the body portion to hold the flexible member in position.

7. A bumper device for automobiles comprising a bumper element, a flexible member extending between the bumper element and the body of the automobile, fastening devices for fastening said flexible element to said bumper and to the automobile body, comprising an enlarged portion with spring portions adapted to pass through holes in the bumper element and the body portion, and having hooks which engage the bumper element and the body portion to hold the flexible member in position, said enlarged portions being embedded in said flexible member.

WILLARD L. MORRISON.